Feb. 1, 1927.

J. W. O'NEILL 1,615,912

RADIUM EMANATOR

Filed Aug. 31, 1925

Witnesses
Inventor
John H. O'Neill,
By George Heideman.
Attorney

Patented Feb. 1, 1927.

1,615,912

UNITED STATES PATENT OFFICE.

JOHN W. O'NEILL, OF CHICAGO, ILLINOIS.

RADIUM EMANATOR.

Application filed August 31, 1925. Serial No. 53,553.

My invention relates to an apparatus for administering radium emanations; the purpose of the invention being to provide an apparatus whereby a greater percentage of radium emanations may be obtained at each inhalation or withdrawal than with devices or means at present employed; more uniform quantities being obtained with each siphoning or withdrawal.

Another object of my invention is to provide an apparatus or device which will prevent the accidental or otherwise introduction of water into the radium tubes or radium element holding portions of the apparatus through the act of blowing into the withdrawal tube of the apparatus.

A further object of the invention is to provide an apparatus wherein the various portions or receptacles are non-emptiable through inadvertence or accidental tipping of the apparatus; while at the same time permitting the water holding portion of the apparatus to be recharged or filled without disturbing or in any way interfering with the various connections between the different portions of the apparatus and without permitting escape or loss of the emanations.

The above enumerated objects, as well as other objects and advantages, will all be more readily comprehended from the following detailed description of the accompanying drawing, wherein.

Figures 1, 2:
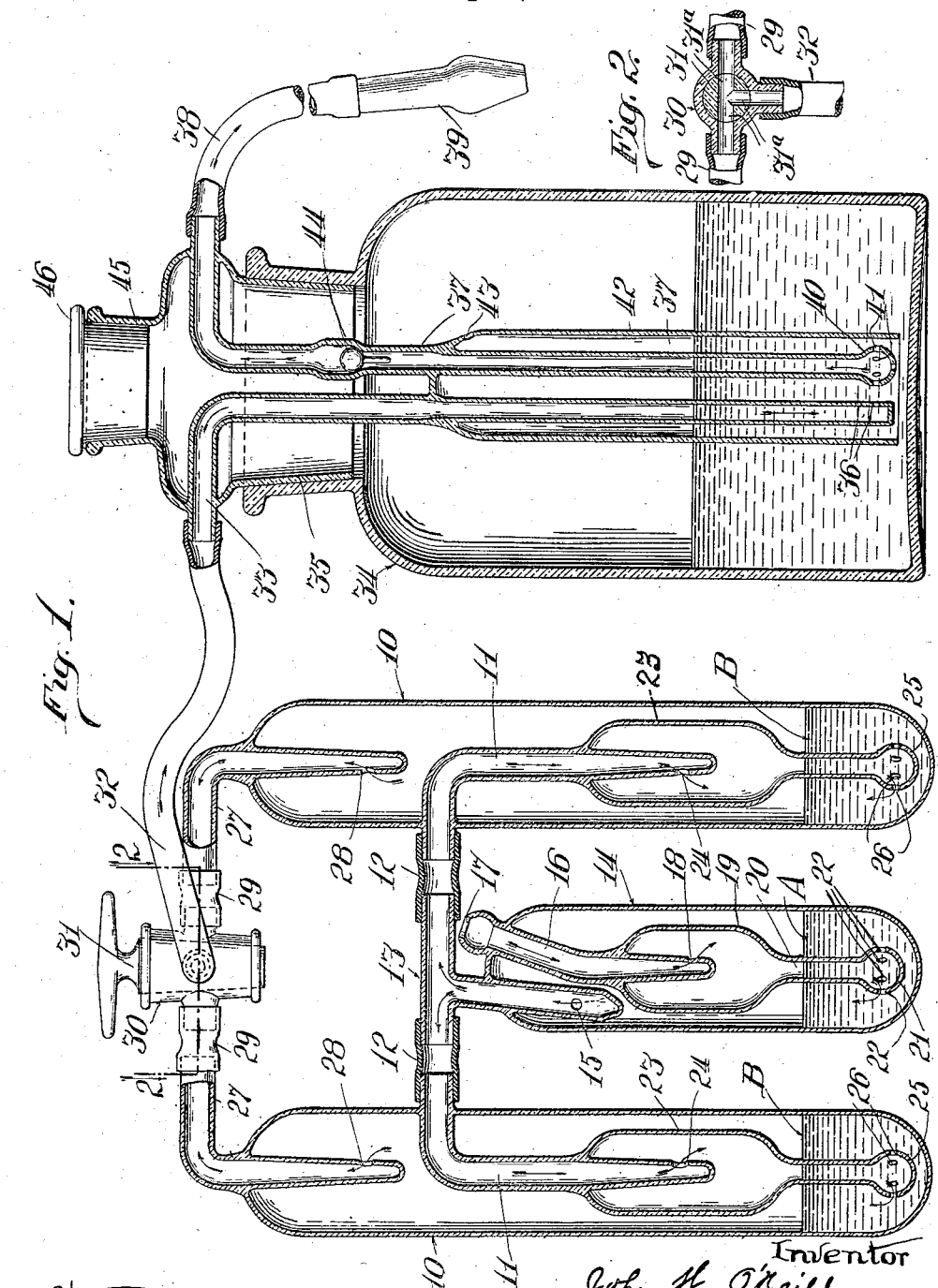
Figure 1 is a sectional elevation of my improved apparatus in condition for use; a portion of the withdrawal tube being broken away.
Figure 2 is a detail sectional view of the control cock or valve; the view being taken substantially on the line 2—2 of Figure 1.

My improved apparatus is especially intended for administering radium emanations in conjunction with a given quantity of pure water or other media; the air, before entering the radium holding receptacles, being passed through a suitable washing and purifying solution before it passes into the water or other media holding receptacle or portion of the apparatus. In the specific exemplification of the invention, the entire apparatus is shown formed of glass which enables the apparatus to be more easily constructed.

The apparatus comprises a suitable or desired number of radium holding members or preferably cylindrical receptacles 10, 10, identical in construction. The two receptacles 10, 10, are shown arranged in spaced parallel relation and each provided with an air admitting tube 11 extending through the opposing side walls of the receptacle in air tight or integral relation with the receptacle so as to prevent escape of the emanations or ingress of air except that which passes through the tube 11. The outer ends of the tubes 11, 11, are shown flexibly connected by means of rubber tubing 12 with a three-way tube 13, which is shown integrally connected with a tubular receptacle 14; the tube 13 preferably extending into the receptacle 14 for about one-quarter of its length. The inner end of this tube 13 is preferably closed and its side at a suitable distance removed from the upper end is provided with a port or opening 15.

The tubular receptacle 14 is intended to contain an alkali or suitable solution for purifying and washing the air which is taken into the apparatus by means of a tube 16 also preferably integrally connected with the receptacle 14. The tube 16 is shown with a slightly enlarged outer end having an air inlet opening 17; while the inner end is shown closed and the side provided with a small opening or port 18 at a slight distance from the lower end. The tube 16 has its lower end surrounded by an enlargement or elongated bulbular portion 19, shown formed integral with the tube 16 and terminating in a tapered portion or stem 20 which in turn terminates in the bulbular closed end 21, which is provided with a suitable number of small openings 22. The end 21 extends to a short distance from the bottom of the receptacle 14 and therefore below the normal level of the purifying and washing solution, as indicated at A. With this construction, it is evident that all air admitted to the apparatus must be taken in through the opening 17 of the tube 16, thence out through opening 18 into the enlargement 19 and out through openings 22. The air therefore is forced to pass through the purifying and washing solution A before it can be withdrawn through the opening 15 into tube 13, to be discharged into the radium holding receptacles 10, 10; or more correctly into the radium holding receptacles from which the emanations are being taken.

The tubes 11 enter the sides of their respective receptacles 10 at a sufficient distance from the bottom of the receptacles so as to permit the inner downwardly disposed ends to be surrounded by an elongated bulbular portion 23 which is preferably formed integral with the inner end of the tube 11. The portion 23 connects with tube 11 at a considerable distance from the lower end and this lower end of tube 11 is closed as shown, with the side wall provided with an opening or port 24, which is arranged at a suitable distance from the upper end of the enlarged portion 23 for a purpose hereinafter set forth.

The enlarged portion 23, like the enlarged portion 19, is shown tapered or reduced at the lower end, which terminates in a bulbular closed end 25, provided with a suitable number of small openings 26. The lower closed end 25 of the enlarged portion 23 in each receptacle 10 is arranged below the normal level of the element indicated at B.

The upper end of each receptacle 10 is shown provided with an integral outlet tube 27 which extends into the receptacle 10 for a predetermined distance, namely a distance somewhat greater than the depth of the normal quantity of the element in the receptacles 10. The lower end of the tube 27 is closed while the side wall at a suitable distance from the upper end is provided with an opening 28, whereby the emanations are withdrawn from the receptacle 10.

The tubes 27 of the element holding receptacles 10 are shown disposed toward each other and suitably connected, as for example by means of rubber or flexible tubing 29, with a three-way cock 30 provided with a valve 31 which is rotatable by means of the finger grasp shown. The valve 31 is provided with the intersecting ports 31ª, see Figure 2, so that the ports may register with both tubes 27 and a tube 32; or one port may be in register with either one of the tubes 27 of receptacles 10, while the other port is in register with the cock outlet with which the flexible tubing 32 is connected. That is to say, the valve 31 may be set so as to permit withdrawal of emanations from both receptacles 10 at the same time, or separately from the receptacle 10 at the left of the cock or from the receptacle 10 at the right of the cock.

The tube 32 connects with the outer end of an inlet tube 33 of a water, or other media, holding receptacle 34. The receptacle 34 is provided with a large hollow stopper or member 35 through which the inlet tube 33 enters and with which it is preferably integrally formed or is hermetically sealed thereto as shown. The tube 33 extends down into close proximity with the bottom of the receptacle 34 and has a closed end, with the side wall provided with one or more small ports or openings 36. Arranged in parallel relation with this tube 33 is a second tube 37, whose upper end extends into the large stopper 35 and passes out through the side thereof, in sealed connection therewith, like the tube 33. The outer end of the tube 37 is shown provided with a flexible tube 38 which is preferably provided with a suitable mouth piece 39 provided with a hole or suitable sized opening to permit proper withdrawal by suction of the solution. The lower end of tube 37 also extends to a point close to the bottom of receptacle 34 and is preferably provided with the closed bulbular end 40 having a suitable number of small openings 41.

The two tubes 33 and 37 are surrounded by a cylinder 42, the upper end whereof is integrally connected with the tubes 33 and 37 and is closed, while the lower end is open and terminates a slight distance from the bottom of the receptacle 34, sufficiently to permit the water, or other media, to enter the cylinder. I have shown the cylinder 42, preferably provided with a minute opening 43 near the top to assure equalization of pressure and therefore a proper level of the solution within the cylinder. This opening, however, may not be necessary in all cases.

It has been found in practice, that approximately one-fifth of the radium emanations are absorbed by the water in the receptacle 34, while four-fifths pass upward through the water and gather in the air space above the water, with the result that unless properly constructed apparatus is employed, a deficient quantity of radium emanations are obtained by the user. For this reason I show the two tubes 33 and 37 surrounded by the cylindrical shell or enclosure 42 which is merely open at bottom. As is apparent, the radium emanations entering receptacle 34 through tube 33, are discharged at the bottom beneath the water level and will rise upwardly through the water (except the percentage absorbed by the water) and accumulate in the upper part of the cylinder 42. As the withdrawal tube 37 is also within the cylinder, it is evident that all of the emanations may be siphoned from the receptacle with the water or other media. If the cylinder is provided with the small port 43, a minute quantity may pass out into the main part of the receptacle; but as the size of the passage through the withdrawal tube is materially greater than that of port 43, practically all of the emanations can be withdrawn before any material amount escapes through the port.

The withdrawal tube 37 at a suitable point, preferably above the cylinder 42, is shown slightly enlarged to receive a check valve 44, in the nature of a small hollow spherical member. The enlarged portion of the tube 37 where the valve is located, is of size sufficient to permit free passage of the solution upwardly about the valve and through the withdrawal tube 37 and outer flexible tube 38.

It will be understood that the large stopper 35, while removable, is formed to provide an air-tight seal for the receptacle 34; and this stopper is hollow and provided with an upwardly disposed neck 45 to receive a smaller stopper or closure member 46. With this construction, it is evident that the receptacle 34 may be provided with pure water or other suitable media by pouring same through the neck 45 of the large stopper 35 after small stopper 46 has been removed. This enables the receptacle 34 to be filled or recharged without disturbing the assembled relation of the various parts of the apparatus.

The relative proportions of the various tubular receptacles, the tubes entering the same and the positions of the ports or openings 15, 18, in receptacle 14, and openings or ports 24 and 28 in both receptacles 10, are such that if the apparatus becomes tilted or inverted, the fluid contents cannot empty or flow out of the respective receptacles, as these receptacles 10, 10 and 11 are usually not filled beyond the fluid level indicated in the drawing. By providing the enlarged portion 19 about the air intake tube 16 of receptacle 14, escape of the fluid due to air pressure within the tube is also prevented.

The enlarged enclosing portions 19 of receptacles 14 and 23 of the receptacles 10, 10 are preferably formed to have a capacity at least double the amount or quantity of solution usually placed in said receptacles. With the closed ended tubes 16 in receptacle 14 and tubes 11, 11 in receptacles 10, 10 extending into the respective enclosures as shown, the respective ports 18 and 24 will be far enough removed from the upper ends of the enclosures to prevent escape of the contents through the tubes in the event of the apparatus becoming inverted. As a result, a non-emptiable apparatus is provided and the improper passage of a solution from one receptacle into the other is prevented. This is quite essential in the administration of the treatment for which my device is especially adapted. The withdrawal or siphon tube 37 is provided with the check-valve 44 to prevent the user blowing through the tube and thereby forcing water upwardly through tube 33 and into the radium receptacles 10, 10. It is also evident that the gas or emanations which may escape into the upper part of receptacle 34 through the port 43 in enclosure 42, will be drawn into the enclosure 42 through the small port 43 through the vacuum or siphoning action set up in the enclosure when the apparatus is in use.

I have illustrated what I believe to be a simple embodiment of my invention, which has been described in terms employed merely as terms of description and not as terms of limitation, as modifications are possible and may be made without, however, departing from the spirit of my invention.

What I claim is:

1. Apparatus of the character described, comprising a sealed radium element holding receptacle provided with an outlet tube in the upper end thereof and an air admitting tube extending into the lower end of the receptacle and provided with an enlargement extending beneath the normal level of the radium element, an independent air purifying and washing solution holding receptacle connected with the air admitting tube of the element receptacle, an air admitting tube for the second mentioned receptacle, extending into the lower end thereof, a fluid holding receptacle provided with inlet and outlet tubes extending to the bottom of said receptacle, the inlet tube being adapted to have communication with the outlet tube of the first receptacle, while the outlet tube of the third receptacle is adapted to permit the contents of said receptacle to be siphoned therefrom, and an emanation receiving chamber disposed about the lower ends of the tubes of said fluid-holding receptacle and communicating at bottom with the fluid holding portion of said receptacle.

2. A radium emanator, comprising a pair of sealed radium element holding receptacles, each provided with an outlet tube in the upper end thereof and an air admitting tube extending into the lower end thereof, means for selectively controlling passage through the outlet tubes, an air purifying and washing solution holding receptacle connected at its top with the air admitting tubes of the first mentioned receptacles, an air admitting tube for the second mentioned receptacle, extending into the lower end thereof, the inner ends of the air-admitting tubes in the three receptacles being formed to prevent egress of the liquid from the receptacles, a water holding receptacle provided with inlet and outlet tubes extending to the bottom of said receptacle, the inlet tube of the last receptacle being connected with said passage controlling means while the outlet tube is adapted to permit the contents of said last receptacle to be siphoned therefrom, a check-valve in said outlet or siphoning tube, and an emanation receiving chamber disposed about the tubes in the water-holding receptacle.

3. A radium emanator, comprising closed radium element holding receptacles provided at top with outlet tubes terminating in the upper ends of said receptacles, said tubes having inner closed ends and each provided with an opening in the side wall at a distance below the upper ends of the receptacles, the outer ends of the tubes of the receptacles being connected by a three-way valve, a purifying solution holding receptacle provided with an air admitting tube leading to the bottom of said receptacle, an outlet tube extending from the upper end of the second mentioned receptacle, having a closed inner end and provided with an opening in the side at a distance removed from the upper end of the receptacle, an air admitting tube for each of said radium holding receptacles, said tubes extending down toward the bottom of the element holding receptacles while the outer ends are connected with the outlet tube of the second mentioned receptacle, a water holding receptacle provided with a pair of tubes terminating adjacent to the bottom, one of said tubes being connected with said three-way valve to receive emanations from said element holding receptacles, while the other tube is provided with a check-valve intermediate of its ends and is adapted to permit the contents of the last mentioned receptacle to be siphoned therefrom.

4. In an apparatus of the character described, a receptacle provided at top with an outlet tube, a second tube extending into said receptacle and provided with a closed inner end and a port in the side wall, and an elongated bulbular enclosure for the inner end of said second tube, extending down into close proximity with the bottom of said receptacle and provided at bottom with openings or ports.

5. In an apparatus of the character described, a closed tubular receptacle, an outlet tube extending through the top and into the receptacle to a predetermined extent and closed at its end while the side is provided with a port at a predetermined point removed from the top of the receptacle, a second tube extending into the receptacle and closed at its inner end, and an elongated enclosure secured to the inner end of said second tube at a distance above the closed end thereof; the lower end of the enclosure extending into close proximity with the bottom of the receptacle and provided with openings, the enclosed inner end of said tube at a predetermined distance below the top of said enclosure being provided in its side with a port.

6. In an apparatus of the character described, a closed receptacle, an outlet tube extending into the receptacle to a predetermined extent and closed at its inner end, the side of the tube being provided with a port at an intermediate point, a second tube extending into the receptacle with a port in the side thereof and closed at its inner end, and an enclosure about the inner end of the second tube extending from a point above the port in said tube into close proximity with the bottom of the receptacle and provided with ports in the lower end thereof, whereby outflow of the receptacle contents is prevented when the receptacle is inverted.

7. In a radium emanator, a fluid holding receptacle provided with a pair of tubes extending down within the receptacle into close proximity with the receptacle bottom, the tubes having sealed relation with the receptacle, and provided with openings adjacent to the lower ends, an enclosure about the tubes within the receptacle, closed at its upper end about the tubes and open at bottom in close proximity to the receptacle bottom, a self-seating check-valve in one of said tubes adapted to prevent ingress, and a closure for said receptacle.

8. A radium emanator, comprising a pair of closed element holding receptacles each provided with an outlet tube, a control element common to both outlet tubes whereby discharge from either one or both of said receptacles may be effected, a purifying medium holding receptacle provided with an air admitting tube and an outlet tube, an inlet tube in each of the radium holding receptacles arranged in communication with the outlet tube of the second mentioned receptacle, all of the tubes of all of the aforementioned receptacles being provided with inner closed ends and provided with ports at points removed from the upper ends within the receptacles, while the inlet tubes of said receptacles are each surrounded by an enlarged, elongated enclosure secured to the tubes and extending down into close proximity with the bottom of its respective receptacle and provided with ports at the bottom, the ports in all of said tubes being so arranged that escape of the contents is prevented when the receptacles are inverted, and a liquid holding receptacle having a removable closure and a pair of tubes extending down in said receptacle into close proximity with the bottom thereof, one of said tubes being in communication with said control element to receive emanations from either or both of said pair of radium holding receptacles, the other tube being adapted to permit a siphoning of the contents of the last mentioned receptacle while preventing introduction therethrough.

9. In an apparatus of the character described, a liquid-holding receptacle provided with an outlet tube extending through the top and into the receptacle to a point beneath the normal liquid level, an emanation introducing tube extending into the receptacle, and an enclosure about the inner ends of both tubes to provide an emanation and liquid-receiving chamber about the tubes and extending into close proximity with the bottom of the receptacle, said enclosure being provided with an opening arranged beneath the minimum level of the receptacle contents for inflow of the liquid and extending above the maximum liquid level in the receptacle to provide an emanation trapping chamber.

10. In an apparatus of the character described, a receptacle provided with an outlet tube extending into the upper part of the receptacle a predetermined extent, a second tube extending into the receptacle, and an enclosure, about the inner end of the second tube, extending into close proximity with the bottom of the receptacle and connected to said second tube at a predetermined point above the opening in the inner end of said tube to provide a liquid trapping chamber above the opening of said tube, said enclosure having an opening at the bottom arranged beneath the minimum level of the receptacle contents.

11. In an apparatus of the character described, a radium element holding receptacle, an air washing receptacle, outlet tubes extending downwardly into the receptacles to a predetermined extent and provided with openings arranged to prevent the contents of the receptacles when inverted to be drained therefrom, a second tube extending downwardly into each of said receptacles, and enclosures about the inner ends of each of the last mentioned tubes, extending into close proximity with the bottoms of the receptacles, with openings at the bottoms of the enclosures arranged beneath the minimum level of the receptacle contents, said enclosures extending to a predetermined extent above the ports of said last mentioned tubes to provide liquid trapping chambers about said tube, the junctures of the tubes and receptacles being hermetically sealed.

12. In a radium emanator, a closed fluid holding receptacle, a radium emanation introducing tube extending down into close proximity with the receptacle bottom, a withdrawal tube extending into the receptacle and terminating adjacent to the bottom thereof, self-seating means in the second tube whereby introduction through said tube is prevented, and an enclosure within the receptable about both tubes, extending into close proximity to the bottom of the receptacle and open at bottom to permit inflow of the fluid in the receptacle, whereby the rising emanations discharged from the first tube are trapped within said enclosure.

JOHN W. O'NEILL.